United States Patent

[11] 3,634,859

| [72] | Inventor | Joachim E. Wolf<br>Severna Park, Md. |
|---|---|---|
| [21] | Appl. No. | 660,565 |
| [22] | Filed | Aug. 8, 1967 |
| [45] | Patented | Jan. 11, 1972 |
| [73] | Assignee | The United States of America as represented by the Secretary of the Air Force |

[54] MOVING TARGET INDICATOR WITH AUTOMATIC CLUTTER RESIDUE CONTROL
2 Claims, 5 Drawing Figs.

[52] U.S. Cl. .................................................. 343/7.7
[51] Int. Cl. .................................................. G01s 9/42
[50] Field of Search ....................................... 343/7.7

[56] References Cited
UNITED STATES PATENTS
3,343,162  9/1967  Evans ........................  343/7.7

Primary Examiner—T. H. Tubbesing
Attorneys—Harry A. Herbert, Jr. and Julian L. Siegel ABSTRACT: A radar system for eliminating effects of varying backgrounds in combination with an MTI. The output of a phase detector with an IF input is fed to an MTI canceller producing a video signal which is fed to a logarithmic amplifier followed by a high-pass FTC filter and then an antilog device.

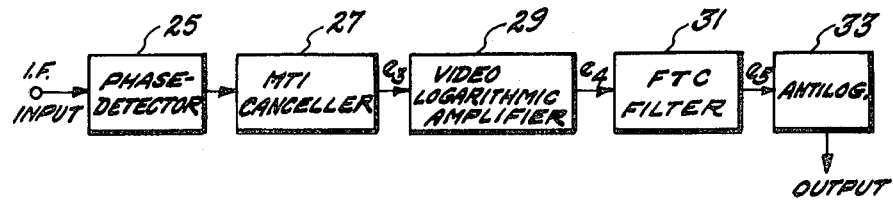

PATENTED JAN 11 1972
3,634,859

INVENTOR.
JOACHIM E. WOLF
BY
Julian F. Siegel
ATTORNEY

MOVING TARGET INDICATOR WITH AUTOMATIC CLUTTER RESIDUE CONTROL

This invention relates to the removal of clutter in radar and more particularly to a moving target indicator in a radar system.

The performance of a moving target indicator radar system (MTI) is given by its capability to reduce the energy of clutter signals with respect to moving target signals. The degree to which this can be done is limited by the inherent turbulence of clutter which in itself can be considered as a kind of moving target information. This turbulence depends on the type of clutter. It is, for instance, much smaller for truly fixed targets, such as buildings, than it is for rain clouds. Usually there will be a variety of clutter types in a particular area covered by radar, which means that the output signal of the MTI system will show clutter residue signals which are quite different in amplitude within a particular radar display.

For an optimum evaluation of moving target information at the MTI output, it is necessary to adjust the system so that the clutter residue is equal to the system noise level. If the clutter residue is smaller than the noise, moving targets which are coincident with the clutter may be lost because they fall below the threshold of detectability. If the clutter residue is larger than the noise level, the following disadvantages become apparent: in a Plan Position Indicator the clutter residue appears as bright spots, creating the impression that the MTI does not cancel the clutter at all; moving targets within clutter areas, although enhanced by the MTI enough to have larger amplitude than the clutter residue, will be covered by the glare of it, rendering the moving target undetectable, and an automatic tracking device cannot detect moving targets in clutter if the clutter residue itself exceeds its threshold which is supposed to distinguish between target information and noise.

In current MTI systems it is only possible to adjust the noise level to be equal to the clutter residue level of one particular type. Since the clutter residue level is different for other types of clutter, present MTI's can only operate effectively for a fraction of the total received clutter information; for the rest of it, useful moving target signals become lost.

The utilization of a Log FTC (fast time-constant) device following the MTI as disclosed in this invention combines the advantages of both of the systems; that is, the capability of the MTI to detect small moving targets within clutter (subclutter visibility) along with the cancellation of individual fixed targets which the Log FTC alone is not capable of, and the capability of the Log FTC to remove the undesired effects of a varying background of signal fluctuations, resulting in a clear or flat display of the video information. The major disadvantage of the Log FTC alone to show off the front edges of clutter areas is greatly reduced in this system because the MTI reduces the amplitude of the step functions at clutter edges by clutter cancellation.

Another important advantage of the suggested system is that manual adjustment of the clutter residue is no longer required. This adjustment has always been a major servicing problem in the past and its complete elimination is most desirable. Further, the overall system stability and reliability is much improved because the signal amplitude at the input of the MTI can vary over a relatively large dynamic range without affecting the false alarm rate of the output signal.

There is also the advantage of an improved antijam capability with this system because certain types of active jamming signals are removed or at least their effect is reduced. This is true of jamming signals which enter the regular signal channel as well as the IF reference channel in the phase detector type of MTI systems.

Accordingly, it is an object of the present invention to provide a radar system which removes clutter.

It is another object to provide a radar system that can detect small moving objects in the field of clutter.

It is still another object to provide an MTI system which has improved antijamming capabilities.

It is still another object to provide a radar system that has a virtually constant false alarm rate of the video signal after clutter cancellation in the MTI.

It is still another object to improve reliability and maintainability of moving target indicator systems.

The above and still other objects, advantages, and features of the invention will become apparent upon consideration of the following detailed description of one embodiment thereof, especially when taken in conjunction with the accompanying drawings, in which:

FIG. 1a is a wave diagram showing clutter residue below a given noise level;

FIG. 1b is a wave diagram showing clutter residue higher than a given noise level;

FIG. 2 is a block diagram showing an embodiment of the invention;

FIG. 3a is an input-output curve of the video logarithmic amplifier; and

FIG. 3b is a curve showing the output of the FTC device.

Referring to FIG. 1a, there is shown line 11, marking the threshold of detectability which is such that moving target 13 is lost as well as clutter residue 15.

IN FIG. 1b, line 17 marking the threshold of detectability is such that the moving target 19 is apparent over the clutter residue. However, a digital-type threshold detector would not be able to distinguish between the clutter residue and the moving target. It would simply detect the clutter residue and would not show the moving target signal in it.

Even if a customary analog type of detection were used, the moving target could easily be lost due to the nonlinear characteristic of CRT displays. It is difficult to detect a target in a display area brightened up by a clutter residue which is larger than noise.

Referring to FIG. 2, the MTI is followed by a device which automatically adjusts the clutter residue equal to the noise level by using an appropriate type of CFAR (constant false alarm rate) device. It functions very much like the known log FTC with, however, a video input signal rather than an IF. Phase detector 25 feeds MTI canceller 27 which has a video signal output. This video signal is then fed into video amplifier 29 which has a logarithmic amplitude characteristic ($e_{out} = a \cdot \log e_{in} + b$). The logarithmic characteristic has the effect of compressing the video signal information so that variation in the output is constant for equal percentage variations of the input signal, resulting in a more uniform amount of signal fluctuation for the various clutter residue signals as well as noise. FIG. 3a shows the logarithmic curve 35 with input signals 37 and 39 and output signals 41 and 43. $e_3$ is the abscissa and represents the input to video logarithmic amplifier 29 while the output thereof is represented by the ordinate $e_4$. The mean level of the clutter residue signal is then removed in high pass filter 31 of the FTC (fast time-constant) type without reducing the detectability of individual targets. Such an FTC is found in the RADIATION LABORATORY SERIES, Vol. I, by Ridenour, pp. 458–559. FIG. 3b represents the output $e_5$ of FTC filter 31. The following antilog device 33 compensates for the nonlinearity of the log amplifier to improve the detectability of the desired individual targets. The invention uses a video logarithmic amplifier and an FTC filter together with a conventional phase detector, MTI canceller, and an antilogarithmic device.

Although the invention has been described with reference to a particular embodiment, it will be understood to those skilled in the art that the invention is capable of a variety of alternative embodiments within the spirit and scope of the appended claims.

It is claimed:

1. A radar system for detecting moving targets and eliminating effects of varying background comprising:
   a. a phase detector having an IF input with a noise and clutter residue component;
   b. a MTI cancelling system fed by the phase detector and having an output signal;
   c. means for automatically adjusting the clutter residue to be equal to the noise level, the adjusting means including a logarithmic amplifier and a high pass filter fed by the logarithmic amplifier;

d. and means for compensating for the nonlinearily of the adjusting means.

2. A system for detecting moving targets and eliminating effects of varying background according to claim 1 wherein the high pass filter is of the fast time constant type.

* * * * *